United States Patent
Ling

(10) Patent No.: US 9,121,637 B2
(45) Date of Patent: Sep. 1, 2015

(54) USING SURFACE HEAT FLUX MEASUREMENT TO MONITOR AND CONTROL A FREEZE DRYING PROCESS

(71) Applicant: MILLROCK TECHNOLOGY INC., Kingston, NY (US)

(72) Inventor: Weijia Ling, Bethlehem, PA (US)

(73) Assignee: MILLROCK TECHNOLOGY INC., Kingston, NY (US)

( * ) Notice: Subject to any disclaimer, the term of this patent is extended or adjusted under 35 U.S.C. 154(b) by 204 days.

(21) Appl. No.: 13/926,344

(22) Filed: Jun. 25, 2013

(65) Prior Publication Data
US 2014/0373382 A1    Dec. 25, 2014

(51) Int. Cl.
*F26B 19/00* (2006.01)
*F26B 5/06* (2006.01)

(52) U.S. Cl.
CPC .................................... *F26B 5/06* (2013.01)

(58) Field of Classification Search
CPC ............... F26B 3/00; F26B 5/00; F26B 5/06; F26B 5/04; F26B 19/00; F26B 25/00; F26B 25/22; F26B 21/00; F26B 21/06; G06F 19/00; F25C 1/00; A23G 9/00
USPC ................ 34/284, 287, 289, 298; 62/70, 373; 73/863.01; 702/50; 435/307.1
See application file for complete search history.

(56) References Cited

U.S. PATENT DOCUMENTS

| | | | | |
|---|---|---|---|---|
| 3,685,163 A | * | 8/1972 | Olt | 34/295 |
| 3,961,424 A | * | 6/1976 | Elerath | 34/284 |
| 4,780,964 A | * | 11/1988 | Thompson, Sr. | 34/292 |
| 5,280,678 A | | 1/1994 | Jennings | |
| 5,367,786 A | | 11/1994 | Jennings | |
| 5,428,905 A | | 7/1995 | Beurel et al. | |
| 5,689,895 A | * | 11/1997 | Sutherland et al. | 34/92 |
| 6,163,979 A | * | 12/2000 | Oetjen et al. | 34/286 |
| 6,176,121 B1 | * | 1/2001 | Oetjen | 73/73 |
| 6,643,950 B2 | * | 11/2003 | Lambert et al. | 34/286 |
| 6,971,187 B1 | * | 12/2005 | Pikal et al. | 34/285 |
| 8,117,005 B2 | | 2/2012 | Barresi et al. | |
| 8,240,065 B2 | * | 8/2012 | Rampersad et al. | 34/558 |
| 8,434,240 B2 | * | 5/2013 | Thompson et al. | 34/285 |
| 8,516,714 B2 | * | 8/2013 | Biemans et al. | 34/284 |
| 8,769,841 B2 | * | 7/2014 | Gruber et al. | 34/287 |
| 8,793,895 B2 | * | 8/2014 | Gasteyer et al. | 34/287 |
| 8,793,896 B2 | * | 8/2014 | Patel et al. | 34/290 |

(Continued)

FOREIGN PATENT DOCUMENTS

CA    2282866 A1  *  3/2000
CN    203758626 U  *  8/2014

(Continued)

*Primary Examiner* — Stephen M Gravini
(74) *Attorney, Agent, or Firm* — Nixon & Vanderhye, PC

(57) ABSTRACT

A method of monitoring and controlling a freeze drying process in a freeze drying apparatus having walls, shelves and a number of vials or trays positioned on different areas of the shelves and containing product to be freeze dried. One or more vials or trays are selected that are representative of the positions of all of the vials or trays in different areas of the shelves. One or more heat flux sensors are positioned between the selected vials or trays and adjacent portions of the walls and/or shelves. The heat transfer between the selected vials or trays and the adjacent wall or shelf portions is measured during the freezing and drying stages of the freeze drying process.

20 Claims, 2 Drawing Sheets

(56) References Cited

U.S. PATENT DOCUMENTS

| | | | |
|---|---|---|---|
| 8,919,007 B2 * | 12/2014 | Friess et al. | 34/90 |
| 8,966,782 B2 * | 3/2015 | Kuu et al. | 34/287 |
| 2006/0053652 A1 * | 3/2006 | Gyory et al. | 34/284 |
| 2008/0098614 A1 | 5/2008 | Tchessalov et al. | |
| 2009/0276179 A1 | 11/2009 | Barresi et al. | |
| 2010/0107436 A1 | 5/2010 | Velardi et al. | |
| 2011/0247234 A1 | 10/2011 | Friess et al. | |
| 2012/0192447 A1 * | 8/2012 | Thompson et al. | 34/287 |
| 2012/0272544 A1 * | 11/2012 | Ling | 34/298 |
| 2014/0026434 A1 * | 1/2014 | Sawada et al. | 34/284 |
| 2014/0041250 A1 * | 2/2014 | Ling | 34/298 |
| 2014/0202025 A1 * | 7/2014 | Ling | 34/298 |
| 2014/0373382 A1 * | 12/2014 | Ling | 34/284 |
| 2015/0040420 A1 * | 2/2015 | Ling | 34/298 |

FOREIGN PATENT DOCUMENTS

| | | | |
|---|---|---|---|
| DE | 3260464 D1 | * | 8/1984 |
| GB | 1221502 A | * | 2/1971 |
| JP | 2010144966 A | * | 7/2010 |
| WO | WO 2007079292 A2 | * | 7/2007 |

* cited by examiner

USING SURFACE HEAT FLUX MEASUREMENT TO MONITOR AND CONTROL A FREEZE DRYING PROCESS

BACKGROUND OF THE INVENTION

1. Field of the Invention

The present invention relates to a method for the monitoring and control of a freeze drying process and, more particularly, to the use of surface heat flux measurement for such monitoring and control.

2. Description of the Background Art

Traditionally only temperature is measured from various points of a system to monitor and control the freeze drying process. However, knowing temperature alone is not enough to control and optimize the freeze drying process, since temperature change is the end result of a heat transfer event. In most cases, the moment an undesirable temperature change is detected, it is too late to make any correction to fix it.

Traditional freeze drying process control is inefficient open loop control due to limited feedback from product temperature and only being able to control the heat transfer fluid temperature from the point at which it flows into the shelf stack. Depending on the different product loads (i.e.: quantity, size and fill of product or vials) as well as the equipment construction (i.e.: shelf construction, fluid pump size and flow rate, etc.) the actual shelf surface temperature varies, although the inlet fluid temperature remains constant. In addition, the heat transfer coefficient changes with vacuum level and product container. This means that the same inlet shelf temperature may result in different product temperatures and therefore different freezing and drying results. The missing link in this control loop is heat flux measurement between shelf and product.

Freezing Step

Freezing, in the freeze drying process, consists of a nucleation process and a post nucleation thermal treatment to produce an ice crystal structure that concentrates the previously dissolved product into a fixed matrix between the ice crystals. Typically, nucleation occurs in a random fashion due to differences in heat transfer resulting in inconsistent crystallization across a batch which results in different drying performance and inconsistent product results. Proper crystal structure allows an elegant cake to be produced which also reduces the total drying time. To produce a consistent crystal structure that aids drying, controlled nucleation is combined with a proper thermal treatment.

Temperature sensors do not provide the feedback required for consistent crystallization process control. For example, during freezing the product may not change temperature, such as during removing latent heat in the freezing step. Although the product temperature doesn't change, there is a significant heat transfer event taking place.

During post nucleation latent heat removal, the speed of heat transfer has a major impact on ice crystal size, orientation and distribution. The ice crystal structure dramatically influences the drying performance and final product appearance. Measuring the heat flow enables better control of the freezing process. This method enables control of the shelf temperature during thermal events when there is no product temperature change.

Drying Step

Drying can be further divided into primary drying and secondary drying steps. Primary drying is a sublimation process where ice in a frozen product turns directly into vapor which is then condensed on a cold condensing surface leaving behind a matrix of concentrated product in the vial or tray on the shelf. Secondary drying is a desorption process. The remaining moisture in the concentrated product matrix is reduced to a level that is best for product long term stability.

Typically, optimized drying requires a process to efficiently remove water without losing the product matrix structure created during the freezing step. The key here is keeping the product at the maximum allowed temperature while still below the critical temperature. The critical temperature is the product temperature above which the product melts and/or the matrix collapses.

There may also be applications when some form of collapse is required. The process can also be monitored, optimized and controlled for these applications.

From a process control perspective, cycle optimization results in a shelf temperature and chamber pressure combination that balances the heat and mass flow and maintains the product at its optimum temperature. Traditionally this is a very challenging task which involves a multi-step trial and error approach, since measuring temperature and pressure alone cannot solve the heat and mass flow balance problem.

Some methods that are currently used for in-process measurement in freeze drying systems are:

MTM—An in-process technique that only calculates the product temperature based on pressure rise measurements. This technique is limited to critical batch sizes and does not provide mass flow information. It can only provide intermittent measurement no faster than every half hour. Measurements are limited to the first half of a cycle as it loses its accuracy in the second half of the cycle.

TDLAS—Tunable Diode Laser—An in-process technique that measures mass-flow through a duct using a laser. This is an expensive technique that works only during the drying stage of the freeze drying process. Only equipment with an external condenser can be fitted with TDLAS. The instrument itself significantly extends the length of the vapor duct and limits the maximum vapor flow rate through the duct to the condenser.

Two container differential heat flux measurement—described in U.S. Pat. No. 5,367,786 is a heat flux based process control method which measures the difference in heat flux between a process monitoring container and a reference container on a single heating or cooling surface. Since no two containers are identical, especially glass vials used in the apparatus, there is a limit to the accuracy of the measurement. Placement of an empty reference container among the sublimating product containers significantly changes the heat transfer mechanism on both measuring and referencing points. As heat transfer can happen between an empty reference container and product containers, measuring accuracy of the differential heat flux can be compromised. Placing a metal foil based radiant shield between two containers further changes the heat transfer mechanism between heating or cooling surfaces. The fundamental limitation of this method is that it significantly changes the heat transfer mechanism, which the method is trying to measure. In a production scale system, placement of the measuring apparatus is impractical. It also requires a temperature probe being directly placed in a product container which is considered invasive. In view of the above limitations, this method has never been widely adopted in either lab or production applications.

Crystal structure may very well be the most important physical property to control in the freeze drying process. However, most of the concentration on improving the freeze drying process has centered on the sublimation or primary drying phase. Since the sublimation process is the longest step in freeze drying, improvements can result in higher output and better product consistency.

Placing vials on a shelf and lowering the shelf temperature, as is done in the majority of freeze dryers, results in non-homogeneous freezing of the product in the vials due to different degrees of super-cooling. The result is varying crystal structures across the vials caused by different nucleation temperatures and rates. The variation in crystal structure results in varying sublimation rates and therefore product inconsistencies.

Primary drying is the longest step of the freeze drying process. Most of the effort for process improvement has focused on measuring and controlling the product temperature as close to its critical point as possible to shorten the cycle. However, without proper ice structures in the frozen product there is a limit to how much faster cycles can be performed without compromising end product quality. Producing a better product crystal structure, through proper freezing, can result in both higher yields due to more uniform cake structure and shorter primary drying cycles due to reduced cake resistance. In general, larger crystals are easier to freeze dry, while small crystals impede sublimation thus lengthening the process. The speed of freezing has a direct effect on the size and type of crystal. Faster freezing produces a smaller crystal, while slower freezing produces are larger crystal. Changes in freezing rate result in varying crystal structures.

The challenge to creating a proper crystal structure is that the typical freezing process does not control the heat flow to the product and therefore crystal growth varies. Placing vials on a shelf and lowering the shelf temperature, as is done in the majority of freeze dryers, results in heterogeneous nucleation across the batch and heterogeneous crystal growth in the vials. The randomness of freezing is due to different degrees of super-cooling and variations in heat flow during the ice crystal growth process. It is important to understand that the rate of crystal growth varies even though the rate of shelf temperature change may not.

The main challenge during this stage of freezing is that nucleation is random and product temperature change does not occur during the phase change of free water from liquid to solid. The rate of crystal growth is dependent on the heat transfer efficiency of the equipment. The heat flow changes significantly as the shelf is cooled and the product freezes. The changing heat flow results in an inconsistent ice structure inside the vial and across the batch.

In order to create the most consistent crystal structure in the vial and across the batch a common starting point and a method for controlling the rate of crystal growth is required. To improve on the current process of freezing, a method for controlled nucleation combined with a method for monitoring and controlling the heat flow during crystallization is required. Producing a controlled nucleation event provides a consistent starting point across the batch for freezing, while controlling the heat flow during crystal formation enables growth of more ideal ice structures. The goal for nucleation is to have all of the vials nucleate at the same time, same temperature and at the same rate. The result will be a consistent starting point across the batch for controlling crystal growth during crystal formation inside the vial.

It is important to point out, that controlled nucleation by itself does not significantly reduce primary drying times. Controlled nucleation provides a homogeneous starting point, but it is proper control of super-cooling and control of post-nucleation crystal growth that can produce a reduction in primary drying time. For example, sucrose super-cooled to −10 C, nucleated, and then cooled rapidly will result in a small crystal structure and minimal improvement in primary drying times. Therefore, post-nucleation thermal treatment is critical to a uniform and freeze drying friendly ice structure inside the vial.

BRIEF SUMMARY OF THE INVENTION

Freeze drying process monitoring and control can be enhanced by reacting to heat flux changes detected before temperature changes occur. One method of measuring heat flux is to use surface heat flux sensors that are designed to obtain a precise direct reading of thermal transfer through a surface in terms of energy per unit time per unit area.

The function of a surface heat flux sensor is to measure heat transfer (loss or gain) through the surface where it is mounted. It does this by indicating the temperature difference between opposite sides of a thin layer of separator material attached to measuring surfaces, thus providing a direct measurement of the heat loss or gain.

The freeze drying process has two major steps: freezing and drying. Each step involves a different heat transfer dynamic between the shelf and product. Freezing is a cooling process with the heat transfer from the vial to the shelf. Drying is a heating process from the shelf to the product.

Using a heat flux sensor, both the freezing and drying steps can be monitored and controlled in a fashion that direct temperature measurement and other methods do not allow. The heat flux measurement method, therefore, provides a control of the entire process and is an in-situ Process Analytical Technology (PAT).

To produce a consistent crystal structure it is necessary to understand the major events that occur during freezing:
  1—Nucleation;
  2—Crystal growth in the freeze concentrate; and
  3—Freeze Concentration (amorphous product) of the maximal freeze concentrate or freeze separation (eutectic product)

If each of these steps can be monitored and controlled, it is possible to produce a consistent crystal structure across an entire batch as well as inside each vial and therefore produce a significantly more consistent final product and even reduce the time of the primary drying phase.
  1—Nucleation The goal for nucleation is to have all of the vials nucleate at the same time, same temperature and at the same rate. The result will be a consistent starting point for controlling crystal structure. Controlled nucleation provides the basis for control of the entire freezing process by providing a consistent starting point for all of the vials. To produce a controlled nucleation event the vials are cooled to a point where the liquid is super-cooled and all the vials have stabilized at a predetermined temperature. Once stable, a catalyst event is introduced to produce the nucleation event. The vials, for example, might be cooled to −5 C and held for 45 minutes to ensure the product is stable. The seeding crystals are introduced into the product chamber inducing nucleation in the vials. The advantages of this approach include simplicity of implementation and low cost.

To ensure that the vials have reached the predetermined temperature, the present method can be used to sense that the heat flow into the vials has dropped to a level where there is no more temperature change taking place. This is done without the use of thermocouples in the vial.

It is important to note that controlled nucleation by itself does not significantly reduce primary drying times. Controlled nucleation provides a homogeneous starting point, but it is the control of crystal growth that can produce a reduction in primary drying time.

2—Crystal Growth

The remaining unfrozen material post-nucleation is an equilibrium freeze concentrate. As the shelf temperature is reduced further energy is removed from the vial. The rate of crystal growth during this freezing step is typically not controlled and the changing heat flow results in an inconsistent ice structure inside the vial. Another factor that affects the rate of crystal growth is heat transfer efficiency of the equipment. Different finishes on the shelf, different heat transfer fluids, and different heat transfer fluid flow rates all have an effect on heat transfer efficiency. During the freezing process the equilibrium freeze concentrate crystalizes and forms a maximal freeze concentrate (Wg'). For example: sucrose has a maximal freeze concentrate of 20% water and 80% sucrose.

One of the main challenges during this stage of freezing is that temperature change does not occur during the phase change from liquid to solid and the rate of change is a result of heat transfer efficiency, which is different in each piece of equipment and for each application.

In situations with uncontrolled nucleation and controlled freezing the crystal structure at the bottom of the vial is smaller than at the top. This results in non-uniform drying and the potential for melt-back or collapse. This is evident by shrinkage at the bottom of the cake toward the end of primary drying.

3—Freeze Separation or Concentration

Once the equilibrium freeze concentrate fully crystallizes, the process has reached the end of latent heat removal and the remaining maximal freeze concentrate begins to separate (eutectic) or concentrate (amorphous). By using the present method, a heat flow rate can be chosen and the rate of crystallization can be controlled until the product temperature is reduced below its eutectic or glass transition temperature. Control during this process produces a consistent structure throughout the maximal freeze concentrate.

Design Space Determination

With the heat flux measurement information a cycle optimization design space can be defined and plotted. Product temperature isotherms, along with shelf temperature isotherms, can be plotted on a mass flux vs chamber pressure diagram. The resulting information can be used to select the optimum shelf temperature and chamber pressure for highest throughput possible in a specific freeze dryer. This quality by design approach maximizes process and product understanding with a minimum of experimentation.

Using the heat flux measurement method one can plot cycle optimization design space with just two cycles run. First, an ice slab sublimation test is performed to find the equipment limit lines. Second, a single product sublimation test is performed to plot all the shelf temperature isotherm lines. The traditional method to calculate vial heat transfer resistance ($K_v$) via weight loss requires a single vacuum set point per run, and several vacuum set points are required. This makes it an extremely lengthy and expensive process.

Another benefit from the heat flux method is limited product samples are required to finish the test run as long as they can cover the area of the sensor. Other methods like TDLAS require many more samples to generate enough vapor flow for accuracy of measurement.

In addition to ensuring that a protocol developed in a small lab freeze dryer is repeatable in a large production freeze dryer, the heat flux measurement method allows a Production Freeze Dryer to be characterized and then simulated on a lab scale unit. For example, the heat flux of an existing protocol can be measured and then repeated in a small system. Typically this is very difficult since the system performance and heat transfer dynamics are much different. Scaling from the lab to production is a major problem in the industry. The main advantage of controlling nucleation and controlling the heat flow is that the freezing profile developed in any freeze dryer can be transferred completely successfully into any other freeze dryer.

DETAILED DESCRIPTION OF THE INVENTION

Figure 1:
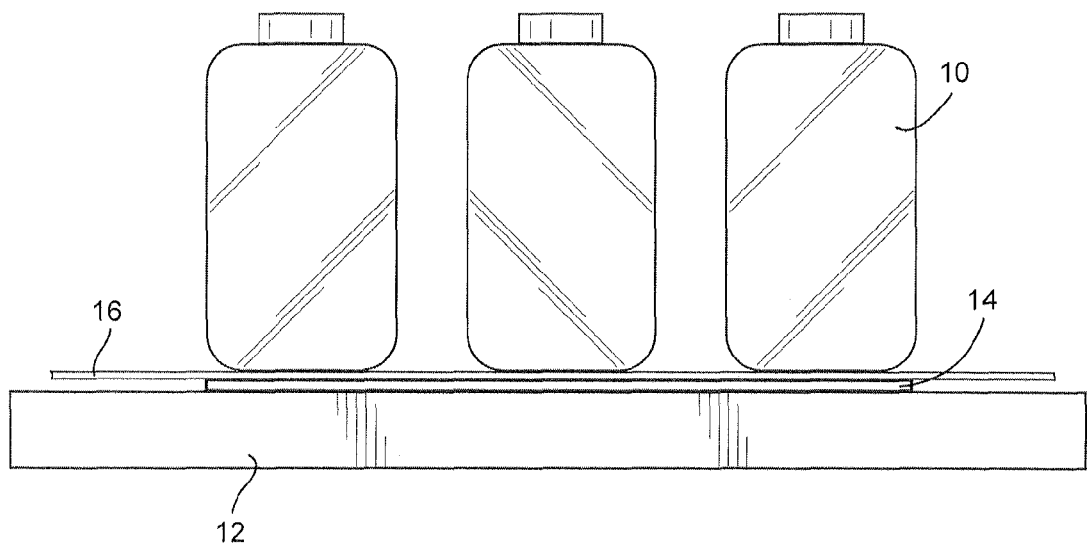
FIG. 1 is an elevational view of a portion of a shelf in a first embodiment of a freeze drying apparatus having one or more product vials mounted thereon with a heat flux sensor mounted on the top surface of the shelf beneath the vials.

Implementation of the present heat flux measurement method in a freeze drying process control opens a new door to optimization and enables a validation trail of the freeze drying cycle. It is based on continuous real time measurement, as opposed to other techniques which only take occasional batch based average estimates or calculations after the cycle is finished. It works throughout the cycle from freezing to the end of drying. It can be easily transferred from lab scale to production as a true Process Analytical Technology (PAT).

Using heat flux to verify the process in-situ can confirm, for the first time, that the process has performed within acceptable parameters. In addition, feedback can be used to prevent damage to the product in process before it happens, in events such as equipment malfunction.

Heat flux sensing provides information that can identify process changes that could accidently occur, such as a change in vial, formulation changes, freeze drying machine performance and other critical parameters that previously have not been measureable.

During a power loss, the cake structure could be affected. Heat flux sensing could be used to confirm that no negative effects in cake structure have occurred, thus saving a batch product.

Using a surface heat flux sensor has major advantages over all other methods for monitoring and controlling a freeze drying process including:

1. Can be used for both the freezing and drying portions of the freeze drying process;
2. Minimally invasive-does not change the heat transfer mechanism;
3. Real-time, continuous measurement;
4. Can be installed on all freeze drying equipment from lab to production scale;
5. Works with both internal and external condenser configurations;
6. Can be used to determine end of primary drying;
7. Eliminates the need for multiple product runs at different pressures to determine an acceptable performance envelope;
8. Acts as a PAT tool and enables real-time monitoring and control of the process, from laboratory to production;
9. Provides in-situ information for Quality by Design with minimum cycle runs;
10. It is equipment and container independent allowing seamless cycle transfer;

11. Is batch size independent, works from a small lot to a full load (MTM and TDLAS require a large batch);

12. Performs direct measurement and does not rely on estimates in calculations (MTM requires that the volume of the chamber be estimated);

13. Can identify changes in critical process parameters, i.e., vial construction, formulation, equipment performance, etc.;

14. Can be used to verify cake integrity post power failure or other equipment or process failure;

15. Low cost; and/or

16. Can be easily implemented.

The heat flux sensor can be implemented in various ways. For example, on most laboratory scaled systems the sensor can be mounted on the top surface of the shelf, while on production scale systems it may be embedded inside the shelf. The mounting location is not limited to the shelf for monitoring and control. It may also be mounted on the walls or other surfaces of the freeze drying apparatus that are near the vials or bulk product and may have a significant heat transfer effect on the process.

Any suitable type of heat flux sensor may be used. As an illustrative example, a low thermal capacitance and low thermal impedance heat flux sensor is suitable for this type of application.

As shown in FIG. 1, one or more product vials 10 are mounted on the center or other portions of one or more shelves 12 in a freeze drying apparatus so as to be representative of the product vials (not shown) in other positions on the shelves 12. One or more heat flux sensors 14 are mounted on the upper surface of the shelves 12 and/or adjacent walls (not shown). A stainless metal foil or other layer 16 expediting heat transfer may be positioned between each heat flux sensor 14 and the product vials 10 to insure accurate measurement of the heat loss or gain between the product vials 10 and the shelves 12.

Figure 2:
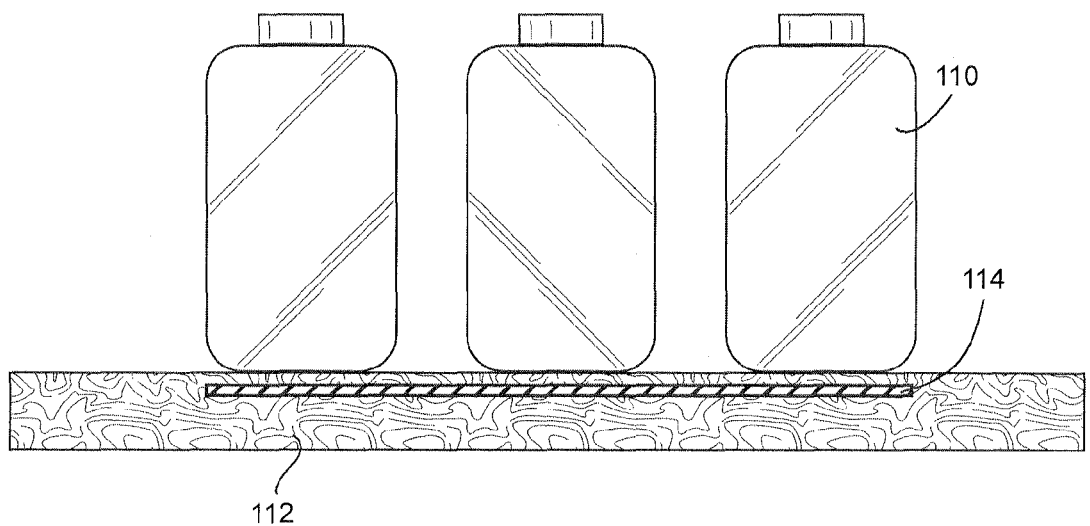
FIG. 2 is an elevational view of a portion of a shelf in a second embodiment of a freeze drying apparatus having a heat flux sensor embedded in the shelf beneath one or more product vials mounted on the shelf.

A modified embodiment is shown in FIG. 2 wherein one or more product vials 110 are mounted on the center or other portions of one or more shelves 112 in a freeze drying apparatus and one or more heat flux sensors 114 are embedded inside the shelves 112 and/or adjacent walls (not shown) beneath or adjacent to the product vials 110.

As illustrative examples, the embodiment of FIG. 1 may be used in laboratory scaled systems and the embodiment of FIG. 2 may be used in production scale systems.

Figure 3:
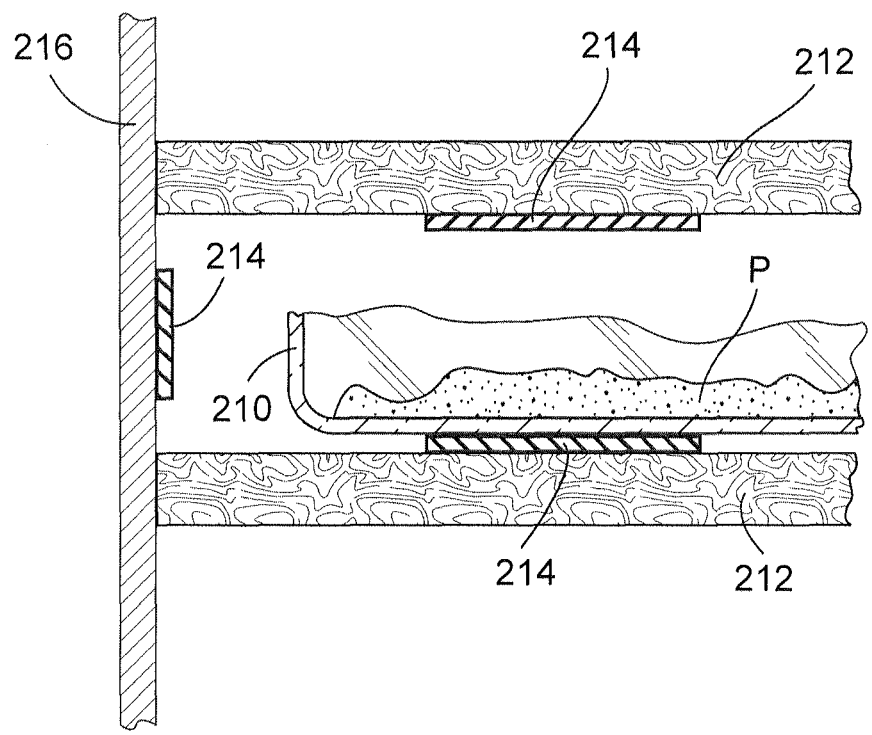
FIG. 3 is an elevational view of a portion of a third embodiment of a freeze drying apparatus wherein one or more heat flux sensors are mounted on walls or shelves that are in contact with or adjacent to bulk product to be freeze dried in the apparatus.

A third embodiment is shown in FIG. 3 wherein bulk product P to be freeze dried is placed in a tray or trays 210 mounted on one or more shelves 212 of a freeze drying apparatus having walls or other surfaces 216. One or more heat flux sensors 214 may be mounted on the shelves 212 adjacent to and above or below the bulk product P. One or more heat flux sensors 214 may also be mounted on the walls or other surfaces 216 of the freeze drying apparatus adjacent to bulk product P on the shelves 212. The heat flux sensors 214 are mounted in selected positions on the shelves 212 or walls 216 adjacent to selected bulk product P so as to be representative of all of the bulk product in the freeze drying apparatus. The heat flux sensors 214 may be mounted on or embedded into the shelves 212, walls 216 or other surfaces adjacent to the bulk product P.

In order to create the most consistent crystal structure in the vial and across the batch a common starting point and a method for controlling the rate of crystal growth is required. Controlled nucleation provides a common starting point by nucleating all the vials at the same temperature, rate, and time. Once the vials are nucleated crystal growth begins in the unsaturated solution. By measuring the heat flow during crystal growth the freezing rate can be determined. Combining this information with the latent heat of ice, it is possible to predict the end of latent heat removal and the end of unsaturated solution crystallization if the heat flow can be controlled.

In most freezing profiles the shelf temperature is ramped to a low temperature at a controlled rate, for example to −40° C. at 0.5° C./min. When the heat flow is monitored it is very apparent that the crystal growth changes dramatically during the crystallization process. With feedback from the heat flux sensors the shelf temperature can be controlled to keep the heat flow at a predetermined level throughout the crystal growth phase of freezing. The result is a homogeneous ice crystal structure throughout the vial and throughout the batch. The crystal growth can be controlled at different rates to develop different crystal sizes.

The heat flux sensor provides in-process information for Heat Flow (dq/dt). With this information a series of calculations can be performed to provide critical information for control of the freeze drying process. Three critical parameters can be determined, including the Vial Heat Transfer Coefficient ($K_v$), Mass Flow (dm/dt), and Product Resistance ($R_p$). The calculations enable the process parameters to be predicted instead of using the typical 'after-the-fact' open-loop control feedback of thermocouples. This makes heat flux based control a true process analytical tool. Once Kv has been determined the product temperature at the bottom of the vial ($T_b$) can be calculated, thus eliminating the need for a thermocouple for monitoring product temperature $K_v$—Vial Heat Transfer Coefficient Vial heat transfer coefficient $K_v$, is an important process variable which has a direct impact on product temperature during the drying step. Its value depends on vial physical properties, chamber vacuum level, and shelf surface finish.

One known method to calculate $K_v$ involves multiple sublimation tests which require the operator to perform a short run and then remove the product from the freeze dryer to measure the actual weight loss in a period of time after each test cycle. This process is performed for each different vacuum level to produce a performance curve. This approach is time consuming and error-prone.

Using the present heat flux measurement method, $K_v$ can be determined (calculated) in real time during the cycle without the time and labor intensive sublimation tests. Having in-process knowledge of $K_v$ totally eliminates the process uncertainty caused by heat transfer efficiency differences. One can calculate the product ice temperature based on shelf surface temperature of $K_v$.

Vial heat transfer coefficient ($K_v$) and Product Temperature ($T_b$) are very useful for Quality by Design (QbD). Any changes in vial characteristics and formulation can be identified.

$$\frac{dq}{dt} = K_v A_v (T_s - T_b) => K_v = \frac{\frac{dq}{dt}}{A_v(T_s - T_b)}$$

Where:

$\frac{dq}{dt}$ = Heat transfer measured from heat flux sensor $K_v$ = Vial heat transfer coefficient to be calculated $A_v$ = Outer cross section area of vial $T_s$ = Shelf surface temperature from measurement $T_b$ = Product temperature at the bottom center of a vial To calculate the $K_v$ a thermocouple is required to measure $T_b$. This is required one time only. Once $K_v$ has been determined, the $T_b$ can be calculated and the thermocouple eliminated.

Dm/dt—Mass Flow

Heat Flow measurement enables the control to be load sensitive. Traditional control on fluid inlet temperature has no real measurement of cooling or heating load on the shelf. A change in load results in a different thermal treatment profile on the product. This is a major obstacle for transferring a process to a different piece of equipment or different batch size. Control based on heat flow makes the process fully transferable and scalable to any size of machine and load.

Mass Flow information gives a real time estimate of when the primary drying cycle can be finished. Previously, end of cycle could only be detected when it happened. With heat flow measurement, it is possible to predict the end of a cycle right from the beginning. During the cycle any process parameter change causes a change in mass flow which can be monitored.

Heat Flow and Mass Transfer Equation:

$$\frac{dq}{dt} = \Delta H_s \frac{dm}{dt} => \frac{dm}{dt} = \frac{\frac{dq}{dt}}{\Delta H_s}$$

Where:

$\frac{dq}{dt}$ = Heat transfer measured from heat flux sensor $\Delta H_s$ = Heat of sublimation of ice $\frac{dm}{dt}$ = Mass transfer rate to be calculated Rp=Product Resistance Product resistance $R_p$ is the resistance to sublimation caused by a dry layer of the product. Its value depends on the ice crystal size, orientation and distribution which is a product of freezing. Most current equipment has no direct measurement of $R_p$. This means that there is no way to verify that the product was frozen the same way from batch to batch. With a real time reading of $R_p$ the ice matrix property can be verified from the moment drying process starts. During the drying process, if the process product temperature causes the dry layer to collapse or crack, a change of product resistance can be monitored in real time. This measurement offers a complete trace of product structure during the drying process, allowing process verification.

Mass Transfer and Product Resistance Equation:

$$\frac{dm}{dt} = \frac{A_p(P_i - P_c)}{R_p} => R_p = \frac{A_p(P_i - P_c)}{\frac{dm}{dt}}$$

Vapor Pressure over ice equation:

$$P_i = 6.112 \, e^{\left(\frac{22.46 \, T_b}{272.62 + T_b}\right)}$$

$$\left(\begin{array}{c}\text{Guide to Meteorological Instruments}\\ \text{and Methods of Observation 2008}\end{array}\right)$$

Where:

$\frac{dm}{dt}$ = Mass transfer rate to be calculated $A_p$ = Inner cross section area of vial $P_i$ = Vapor pressure of ice calculated from ice temperature $T_b$ $P_c$ = Chamber pressure $R_p$ = Resistance of the dried product layer to be calculated $T_b$ = Product temperature at the bottom center of a vial The heat flow information can be used to determine:

Heat Flow

Freezing:
- determine that the product is ready for controlled nucleation;
- control the shelf temperature for controlled crystal growth;
- determine that the product has reached the end of freezing and is ready for primary drying;

Primary drying:
- Calculate the product temperature during the entire primary drying process;
- Determine the end of primary drying (when the heat flow approaches zero)

Product Temperature
- Determine the product temperature through calculation to eliminating the need for invasive temperature measurement methods, such as thermocouples;
- Verify the product did not rise above the critical temperature;
- Feed back to the control system to adjust the shelf temperature to constantly keep the product below its critical temperature while maximizing the shelf temperature, thus reducing primary drying times.

Mass flow
- Calculate the end of primary drying time:
  - Calculate the mass flow and remaining material to determine the amount of time that is left in primary drying;
- Define a design space for equipment (QbD—Quality by Design):
  - Adjust the vacuum level and shelf temperature to develop design space in a single run.

Process Analytical Technology (PAT)

To determine if any changes to the process have occurred, the heat flow will change. Process changes could be the result of, but not limited to:
- Vial characteristics
- Fill levels
- Equipment performance
- Other factors Features:
- True Process Analytical Technology for monitoring and control of the entire freezing and drying process;
- QbD Tool for developing design space;
- Identify changes in process:
  - Change in vials;
  - Change in fill amount.
- Determine if collapse or melt-back is taking place.

From the foregoing description, it will be readily seen that the present heat flux method is simple, inexpensive, easily implemented and is a minimally invasive, reliable, efficient and accurate method for monitoring and controlling both the freezing and drying portions of the freeze drying process of different types of freeze drying apparatus.

While the invention has been described in connection with what is presently considered to be practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of monitoring and controlling a freeze drying process in a freeze drying apparatus having walls, one or more shelves and one or more vials or trays positioned on different areas of the shelves and containing product to be freeze dried, comprising:
   selecting one or more vials or trays that are representative of the positions of all of the vials or trays in different areas of the shelves,
   positioning one or more heat flux sensors between the selected vials or trays and adjacent portions of the walls and/or shelves,
   measuring the heat flow between the selected vials or trays and adjacent wall or shelf portions during a freezing stage of the freeze drying process, and
   controlling the shelf temperature to keep the heat flow at a predetermined level throughout a crystal growth phase of freezing to produce a homogeneous ice crystal structure in the product during the freezing stage.

2. The method of claim 1 wherein one or more heat flux sensors are mounted on a top or bottom surface of adjacent shelf portions.

3. The method of claim 1 wherein one or more heat flux sensors are embedded inside shelf portions adjacent to the selected vial or trays.

4. The method of claim 1 wherein one or more heat flux sensors are mounted on or embedded inside the wall portions adjacent to the selected vials or trays.

5. The method of claim 1 further comprising using the heat flow measurement information to define and plot a cycle optimization design space and an optimum shelf temperature and chamber pressure for use in a laboratory or production freeze drying apparatus.

6. The method of claim 1 further comprising using heat flow measurement information to determine the end of the freezing stage when the heat flow has reduced to a steady state condition near zero.

7. The method of claim 1 further comprising using heat flow measurement information to shorten a primary drying time and to determine that the product has been properly sublimated during a primary drying stage by controlling the shelf temperature to maintain the product below a critical temperature above which it melts and to maximize the shelf temperature during the entire primary drying stage.

8. The method of claim 7 further comprising using heat flow measurement information to determine the end of the primary drying stage when the heat flow has reduced to a steady state condition near zero.

9. The method of claim 1 wherein the temperature is controlled to produce ice crystals of a size and uniformity that will shorten drying time during a primary drying stage.

10. The method of claim 1 wherein the product is nucleated at a predetermined and controlled temperature, time and rate to produce a uniform initial ice crystal structure prior to the crystal growth phase of the freezing stage.

11. The method of claim 10 wherein heat transfer information is used to determine that the product has reached the predetermined temperature so that there is no more temperature change taking place.

12. The method of claim 1 wherein the heat flux sensor is a low thermal capacitance and low thermal impedance sensor.

13. The method of claim 7 further comprising using heat transfer measurement information to determine the critical parameters of Vial Heat Transfer Coefficient ($K_v$), Mass Flow (dm/dt) and Product Resistance ($R_p$) for control for the freeze drying process.

14. The method of claim 13 wherein once the Vial Heat Transfer Coefficient ($K_v$) is calculated it is used to calculate the product temperature ($T_b$) at the bottom of the vial.

15. The method of claim 13 wherein the Vial Heat Transfer Coefficient (Kv) is determined by the following formula:

$$\frac{dq}{dt} = K_v A_v (T_s - T_b) => K_v = \frac{\frac{dq}{dt}}{A_v(T_s - T_b)}$$

Where:

$\frac{dq}{dt}$ = Heat transfer measured from heat flux sensor $K_v$ = Vial heat transfer coefficient to be calculated $A_v$ = Outer cross section area of vial $T_s$ = Shelf surface temperature from measurement $T_b$ = Product temperature at the bottom center of a vial 16. The method of claim 13 wherein the Mass Flow (dm/dt) is determined by the following formula:

$$\frac{dq}{dt} = \Delta H_s \frac{dm}{dt} => \frac{dm}{dt} = \frac{\frac{dq}{dt}}{\Delta H_s}$$

Where:

$\frac{dq}{dt}$ = Heat transfer measured from heat flux sensor $\Delta H_s$ = Heat of sublimation of ice $\frac{dm}{dt}$ = Mass transfer rate to be calculated 17. The method of claim 13 wherein the Product Resistance ($R_p$) is determined by the following formula:

$$\frac{dm}{dt} = \frac{A_p(P_i - P_c)}{R_p} => R_p = \frac{A_p(P_i - P_c)}{\frac{dm}{dt}}$$

Vapor Pressure over ice equation:

$$P_i = 6.112 \, e^{\left(\frac{22.46 \, T_b}{272.62 + T_b}\right)}$$

$$\left(\begin{array}{c} \text{Guide to Meteorological Instruments} \\ \text{and Methods of Observation 2008} \end{array}\right)$$

Where:

$\frac{dm}{dt}$ = Mass transfer rate to be calculated $A_p$ = Inner cross section area of vial $P_i$ = Vapor pressure of ice calculated from ice temperature $T_b$ $P_c$ = Chamber pressure $R_p$ = Resistance of the dried product layer to be calculated $T_b$ = Product temperature at the bottom center of a vial.

18. The method of claim 7 wherein the heat flow information is used to define freeze drying protocols that can be used in different types of laboratory or production freeze drying apparatus.

19. A method of monitoring and controlling a freeze drying process in a freeze drying apparatus having walls, one or more shelves and one or more vials or trays positioned on different areas of the shelves and containing product to be freeze dried, comprising:

selecting one or more vials or trays that are representative of the positions of all of the vials or trays in different areas of the shelves, measuring heat flow between the selected vials or trays and adjacent wall or shelf portions during a freezing stage of the freeze drying process; and controlling the shelf temperature to keep the heat flow at a predetermined level throughout a crystal growth phase of freezing to produce a homogenous ice crystal structure in the product during the freezing stage.

20. The method of claim 19 further comprising using heat flow measurement information to determine the end of the freezing stage when the heat flow has reduced to a steady state condition near zero.

\* \* \* \* \*